United States Patent
Zhang et al.

(10) Patent No.: US 10,912,091 B2
(45) Date of Patent: Feb. 2, 2021

(54) RADIO RESOURCE CONFIGURATION METHOD AND DEVICE

(71) Applicant: HUAWEI TECHNOLOGIES CO., LTD., Shenzhen, Guangdong (CN)

(72) Inventors: Yingyu Zhang, Shenzhen (CN); Jianmin Lu, Shanghai (CN); Zhenfei Tang, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/161,863

(22) Filed: Oct. 16, 2018

(65) Prior Publication Data

US 2019/0053241 A1 Feb. 14, 2019

Related U.S. Application Data

(63) Continuation of application No. 14/839,219, filed on Aug. 28, 2015, now Pat. No. 10,111,225, which is a
(Continued)

(51) Int. Cl.
*H04W 72/04* (2009.01)
*H04L 5/00* (2006.01)
(Continued)

(52) U.S. Cl.
CPC ........ *H04W 72/0453* (2013.01); *H04B 1/713* (2013.01); *H04B 7/0626* (2013.01);
(Continued)

(58) Field of Classification Search
None
See application file for complete search history.

(56) References Cited

U.S. PATENT DOCUMENTS

2007/0217440 A1  9/2007  Cho et al.
2008/0260059 A1  10/2008  Pan et al.
(Continued)

FOREIGN PATENT DOCUMENTS

CN  101155400 A  4/2008
CN  101675696 A  3/2010
(Continued)

OTHER PUBLICATIONS

XP050455187. CATT: "Inconsistency in aggregated channel bandwidth between BS and UE", 3GPP DRAFT; R4-103477, Oct. 11, 2010, Oct. 7, 2010. 3 pages.
(Continued)

*Primary Examiner* — Fahmida S Chowdhury
(74) *Attorney, Agent, or Firm* — Gregg L. Jansen

(57) ABSTRACT

A radio resource configuration method and device are disclosed. The radio resource configuration method includes: after a piece of user equipment UE establishes a connection with a base station according to a system bandwidth in a broadcast message, determining, by the base station for the UE, resource configuration used for communication between the UE and the base station, where the resource configuration includes at least one of a resource allocation bandwidth, a channel state information CSI pilot bandwidth, and a CSI measurement bandwidth, where the resource allocation bandwidth is a bandwidth used to generate resource block allocation information in downlink control information; and sending, by the base station to the UE by using dedicated signaling or a common message, the resource configuration determined for the UE and used for communication between the UE and the base station.

38 Claims, 7 Drawing Sheets

Related U.S. Application Data continuation of application No. PCT/CN2013/071964, filed on Feb. 28, 2013.

(51) Int. Cl.
  *H04B 1/713* (2011.01)
  *H04B 7/06* (2006.01)

(52) U.S. Cl.
  CPC ......... *H04L 5/0057* (2013.01); *H04W 72/042* (2013.01); *H04W 72/0413* (2013.01); *H04L 5/0094* (2013.01)

(56) References Cited

U.S. PATENT DOCUMENTS

| | | | |
|---|---|---|---|
| 2009/0325585 A1 | 12/2009 | Farajidana et al. | |
| 2010/0118719 A1 | 5/2010 | Ishii et al. | |
| 2010/0315962 A1 | 12/2010 | Imai et al. | |
| 2010/0331030 A1 | 12/2010 | Nory et al. | |
| 2011/0136495 A1* | 6/2011 | Chen | H04L 5/0055 455/450 |
| 2011/0151913 A1 | 6/2011 | Forster et al. | |
| 2011/0170498 A1 | 7/2011 | Liu et al. | |
| 2011/0205995 A1 | 8/2011 | Grøvlen | |
| 2011/0255485 A1* | 10/2011 | Chen | H04L 5/0094 370/329 |
| 2011/0267978 A1 | 11/2011 | Etemad | |
| 2011/0305211 A1* | 12/2011 | Lunttila | H04L 5/0092 370/329 |
| 2011/0317581 A1 | 12/2011 | Hoshino et al. | |
| 2012/0034945 A1 | 2/2012 | Wang | |
| 2012/0076115 A1 | 3/2012 | Noh et al. | |
| 2012/0263117 A1* | 10/2012 | Love | H04L 5/003 370/329 |
| 2012/0270585 A1 | 10/2012 | Feng et al. | |
| 2012/0320778 A1 | 12/2012 | Lv et al. | |
| 2012/0327894 A1 | 12/2012 | Axmon et al. | |
| 2013/0003668 A1 | 1/2013 | Xiao et al. | |
| 2013/0089048 A1 | 4/2013 | Damnjanovic et al. | |
| 2013/0196632 A1* | 8/2013 | Horn | H04W 48/16 455/411 |
| 2014/0073317 A1* | 3/2014 | Zhou | H04W 28/0289 455/424 |
| 2014/0098761 A1 | 4/2014 | Lee et al. | |
| 2014/0126490 A1 | 5/2014 | Chen et al. | |
| 2014/0126498 A1 | 5/2014 | Koorapaty et al. | |
| 2014/0254438 A1 | 9/2014 | Long et al. | |
| 2014/0254452 A1 | 9/2014 | Golitschek Edler Von Elbwart et al. | |
| 2014/0314175 A1 | 10/2014 | Nilsson | |
| 2015/0009939 A1 | 1/2015 | Zhang et al. | |
| 2015/0124754 A1 | 5/2015 | Forster et al. | |
| 2015/0296514 A1 | 10/2015 | Morioka et al. | |
| 2015/0358131 A1* | 12/2015 | Siomina | H04J 11/0056 370/252 |
| 2017/0012761 A1 | 1/2017 | Koorapaty et al. | |

FOREIGN PATENT DOCUMENTS

| | | |
|---|---|---|
| CN | 101998647 A | 3/2011 |
| CN | 102165730 A | 8/2011 |
| CN | 102177758 A | 9/2011 |
| CN | 102356577 A | 2/2012 |
| CN | 102461053 A | 5/2012 |
| CN | 102685797 A | 9/2012 |
| CN | 102714566 A | 10/2012 |
| CN | 102763477 A | 10/2012 |
| CN | 102904835 A | 1/2013 |
| CN | 103327615 A | 9/2013 |
| CN | 103634912 A | 3/2014 |
| CN | 102238692 B | 7/2014 |
| CN | 103959826 A | 7/2014 |
| CN | 103988460 A | 8/2014 |
| CN | 104871581 A | 8/2015 |
| CN | 104956753 A | 9/2015 |
| GB | 2510137 A | 7/2014 |
| WO | 2011082534 A1 | 7/2011 |
| WO | 2012124551 A1 | 9/2012 |

OTHER PUBLICATIONS

3GPP TS 36.101 V11.3.0 3rd Generation Partnership Project; Technical Specification Group Radio Access Network; Evolved Universal Terrestrial Radio Access (E-UTRA);User Equipment (UE) radio transmission and reception(Release 11), Technical Specification, Dec. 2012, 392 pages.

3GPP TS 36.213 V11.1.0 (Dec. 2012);3rd Generation Partnership Project;Technical Specification Group Radio Access Network;Evolved Universal Terrestrial Radio Access (E-UTRA);Physical layer procedures(Release 11),total 160 pages. (Dec. 2012).

3GPP TS 36.300 V11.4.0 (Dec. 2012),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 11),total 207 pages. (Dec. 2012).

3GPP TS 36.213 V11.0.0 (Sep. 2012);3rd Generation Partnership Project;Technical Specification Group Radio Access Network;Evolved Universal Terrestrial Radio Access (E-UTRA);Physical layer procedures(Release 11);total 143 pages.

RAN1,"Concept of carrier segment for LTE-A",3GPP TSG-WG1 #58bis R1-094415,Miyazaki, Japan, Oct. 12-16, 2009, total 2 pages.

Fujitsu,"On support of low-cost MTC terminals with reduced Tx/Rx",3GPP TSG-RAN WG1 Meeting #66 R1-112669, Athens, Greece, Aug. 22-26, 2011,total 2 pages.

Huawei et al.,"Further considerations on reduction of maximum bandwidth for low cost MTC",3GPP TSG RAN WG1 Meeting #71 R1-125163, New Orleans, USA, Nov. 12-16, 2012, total 4 pages.

Qualcomm Incorporated,"Flexible Bandwidth Usage for UMTS FDD",3GPP TSG RAN WG1 Meeting #71 R1-125194,New Orleans, USA, Nov. 12-16, 2012, total 12 pages.

China Unicom et al., "Considerations on Scalable Bandwidth Support for UMTS FDD", 3GPP TSG RAN WG1 Meeting #71 R1-125226,New Orleans, USA, Nov. 12-16, 2012, total 3 pages.

NTT DOCOMO, "Design for Synchronized New Carrier Type", 3GPP TSG RAN WG1 Meeting #72 R1-130398, St Julian's, Malta, Jan. 28-Feb. 1, 2013, total 3 pages.

Huawei et al., "Flexible air interface for 5G", 3GPP TSG RAN WG1 Meeting #84bis R1-162144,Busan, Korea, Apr. 11-15, 2016, total 3 pages.

Huawei et al.,"WF on SS burst set composition",3GPP TSG RAN WG1 Meeting #88 R1-170xxx(R1-1703871), Athens, Greece, Jan. 13-17, 2017, total 8 pages.

MediaTek et al., "Way Forward on bandwidth part in NR", 3GPP TSG-RAN WG1 #88bis R1-1706745, Spokane, USA, Apr. 3-7, 2017, total 2 pages.

Catt,"Offline summary for AI 7.1.2.2 Remaining details on Remaining Minimum System Information", 3GPP TSG RAN WG1 Meeting 90bis R1-1718772, Prague, CZ, Oct. 9-13, 2017, total 13 pages.

NEC Group,"ePDCCH PRB configuration", 3GPP TSG RAN WG1 Meeting #70bis R1-124293, San Diego, USA, Oct. 8-12, 2012, total 5 pages.

* cited by examiner

RADIO RESOURCE CONFIGURATION METHOD AND DEVICE

CROSS-REFERENCE TO RELATED APPLICATIONS

This application is a continuation of U.S. patent application Ser. No. 14/839,219, filed on Aug. 28, 2015, which is a continuation of International Application No. PCT/CN2013/071964, filed on Feb. 28, 2013. All of the afore-mentioned patent applications are hereby incorporated by reference in their entireties.

TECHNICAL FIELD

Embodiments of the present invention relate to the field of communications technologies, and in particular, to a radio resource configuration method and a device.

BACKGROUND

In existing wireless communications standards such as the 3rd Generation Partnership Project (The 3rd Generation Partnership Project, 3GPP) Long Term Evolution (Long Term Evolution, LTE), a network side broadcasts a system bandwidth, namely, a spectrum resource, used by a current cell; and a piece of user equipment (User Equipment, UE) communicates with the network side within the notified system bandwidth.

Specifically, from establishment of a radio resource control (Radio Resource Control, RRC) protocol link to actual service transmission, all spectrum resources, of the UE, used for data receiving and transmission are limited within the system bandwidth broadcast by a system, and these spectrum resources need to satisfy a limited number of standard bandwidth values that are defined by a standard. In addition, to implement downlink dynamic adaptation, the UE needs to measure downlink reference signals, and feeds back a measurement result to the network side, where these downlink reference signals for measuring channel state information are all transmitted based on a limited number of standard bandwidths, and a measurement manner used on the side of the UE is also based on the several standard bandwidths.

However, an actual available bandwidth is different from the system bandwidth to some extent in an actual situation. For example, in many scenarios such as frequency-division multiplexing (Frequency-division multiplexing, FDM) inter-cell interference coordination (Inter-Cell Interference Coordination, ICIC), a non-standard spectrum, and a capability difference between UEs, there is a case in which an actual available bandwidth is inconsistent with the system bandwidth.

The configuration manner in the prior art in which the network side limits all working spectrums of the UE within the system bandwidth cannot effectively and fully use a radio resource.

SUMMARY

Embodiments of the present invention provide a radio resource configuration method and a device, so that a radio resource can be effectively and fully used.

To resolve the foregoing technical problem, the embodiments of the present invention disclose the following technical solutions:

According to a first aspect, a radio resource configuration method is provided, after a piece of user equipment UE establishes a connection with a base station according to a system bandwidth in a broadcast message, including:

determining, by the base station for the UE, resource configuration used for communication between the UE and the base station, where the resource configuration includes at least one of a resource allocation bandwidth, a channel state information CSI pilot bandwidth, and a CSI measurement bandwidth, where the resource allocation bandwidth is a bandwidth used to generate resource block allocation information in downlink control information; and sending, by the base station to the UE by using dedicated signaling or a common message, the resource configuration that is determined for the UE and used for communication between the UE and the base station.

With reference to the first aspect, in a first possible implementation manner, if the resource configuration includes the resource allocation bandwidth, a value of the resource allocation bandwidth and a value of the system bandwidth are independent from each other; and/or if the resource configuration includes the CSI pilot bandwidth, a value of the CSI pilot bandwidth and a value of the system bandwidth are independent from each other; and/or if the resource configuration includes the CSI measurement bandwidth, a value of the CSI measurement bandwidth and a value of the system bandwidth are independent from each other.

With reference to the first aspect, and/or the first possible implementation manner, in a second possible implementation manner, the determining, by the base station for the UE, resource configuration used for communication between the UE and the base station includes:

determining, by the base station, an actual available bandwidth of the UE; and determining, by the base station according to the actual available bandwidth of the UE, the resource configuration used for communication between the UE and the base station.

With reference to the second possible implementation manner, in a third possible implementation manner, the determining, by the base station, an actual available bandwidth of the UE includes:

determining, by the base station, the actual available bandwidth of the UE according to an access process of the UE or a UE capability reported by the UE.

With reference to the second possible implementation manner, in a fourth possible implementation manner, the determining, by the base station according to the actual available bandwidth of the UE, the resource configuration used for communication between the UE and the base station includes:

if the resource configuration includes the resource allocation bandwidth, determining that the actual available bandwidth is located within the resource allocation bandwidth; and/or if the resource configuration includes the CSI pilot bandwidth, determining that the CSI pilot bandwidth is located within the actual available bandwidth; and/or if the resource configuration includes the CSI measurement bandwidth, determining that the CSI measurement bandwidth is located within the actual available bandwidth.

With reference to the first aspect, and/or the first possible implementation manner, and/or the second possible implementation manner, and/or the third possible implementation manner, and/or the fourth possible implementation manner, in a fifth possible implementation manner, if the resource configuration includes the resource allocation bandwidth, the determining, by the base station, resource configuration used for communication between the UE and the base station includes:

determining, by the base station, a resource allocation bandwidth used by resource allocation indication information of a physical data channel, where a logical channel carried by the physical data channel is a non-common logical channel.

With reference to the fifth possible implementation manner, in a sixth possible implementation manner, a size of a resource block group RBG used by the resource allocation indication information of the physical data channel is consistent with a size of an RBG determined by the system bandwidth.

With reference to the first aspect, and/or the first possible implementation manner, and/or the second possible implementation manner, and/or the third possible implementation manner, and/or the fourth possible implementation manner, and/or the fifth possible implementation manner, in a seventh possible implementation manner, the CSI pilot includes at least one of the following:

a non-zero power CSI reference signal NZP CSI-RS, a zero power CSI reference signal ZP CSI-RS, a cell specific reference signal CRS, and a sounding reference signal SRS.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, in an eighth possible implementation manner, if the resource configuration includes the CSI pilot bandwidth, and the CSI pilot bandwidth is an SRS frequency domain resource, the SRS frequency domain resource and an uplink system bandwidth are independent from each other.

With reference to the eighth possible implementation manner, in a ninth possible implementation manner, if a CSI pilot is an uplink SRS, the determining, by the base station, resource configuration used for communication between the UE and the base station includes:

determining, by the base station, UE-level SRS bandwidth configuration $C_{SRS}$, an SRS bandwidth $B_{SRS}$, a frequency hopping bandwidth $b_{hop}$, and a frequency domain position $n_{RRC}$ of the UE, so that the UE determines an SRS frequency domain resource according to the UE-level $C_{SRS}$, the $B_{SRS}$, the $b_{hop}$, and the $n_{RRC}$; or determining, by the base station, an SRS allocation bandwidth $N_{RB,SRS}^{UL}$, UE-level or cell-level $C_{SRS}$, $B_{SRS}$, $b_{hop}$, and $n_{RRC}$ of the UE, so that the UE determines an SRS frequency domain resource according to the $N_{RB,SRS}^{UL}$, the UE-level or cell-level $C_{SRS}$, the $B_{SRS}$, the $b_{hop}$, and the $n_{RRC}$.

With reference to the first aspect, and/or the first possible implementation manner, and/or the second possible implementation manner, and/or the third possible implementation manner, and/or the fourth possible implementation manner, in a tenth possible implementation manner, if the resource configuration includes the CSI pilot bandwidth and the CSI measurement bandwidth, the CSI measurement bandwidth is located within the CSI pilot bandwidth.

With reference to the first aspect, and/or the first possible implementation manner, and/or the second possible implementation manner, and/or the third possible implementation manner, and/or the fourth possible implementation manner, in an eleventh possible implementation manner, the base station determines multiple CSI measurement bandwidths for the UE, so that the UE independently performs CSI measurement in each CSI measurement bandwidth.

With reference to the first aspect, and/or the first possible implementation manner, and/or the second possible implementation manner, and/or the third possible implementation manner, and/or the fourth possible implementation manner, in a twelfth possible implementation manner, when the method is applied to a multi-carrier scenario that includes at least a first carrier and a second carrier, the determining, by the base station for the UE, resource configuration used for communication between the UE and the base station includes:

determining, by the base station for the UE, the resource configuration on the first carrier; and the method further includes:

determining, by the base station, scheduling information of the UE on the second carrier, where the scheduling information includes at least one of a resource allocation bandwidth, a CSI pilot bandwidth, and a CSI measurement bandwidth, and frequency number information of the second carrier.

With reference to the twelfth possible implementation manner, in a thirteenth possible implementation manner, the scheduling information further includes parameters for determining a signal waveform of the second carrier.

With reference to the twelfth possible implementation manner, in a fourteenth possible implementation manner, before the base station determines the scheduling information of the UE on the second carrier by using the first carrier, the method further includes:

determining, by the base station, an actual available bandwidth of the UE on the second carrier; and the determining, by the base station, scheduling information of the UE on the second carrier is specifically:

determining, by the base station, the scheduling information of the UE on the second carrier according to the actual available bandwidth of the UE on the second carrier.

With reference to the fourteenth possible implementation manner, in a fifteenth possible implementation manner, the determining, by the base station, an actual available bandwidth of the UE on the second carrier includes:

broadcasting, by the base station, spectrum indication information;

receiving, by the base station, a spectrum that is sent by the UE and selected by the UE based on the spectrum indication information broadcast by the base station; and determining, by the base station, the received spectrum, selected by the UE, as the actual available bandwidth.

With reference to the fourteenth possible implementation manner, in a sixteenth possible implementation manner, the determining, by the base station, an actual available bandwidth of the UE on the second carrier includes:

receiving, by the base station, a spectrum range that is sent by the UE and selected by the UE within an available spectrum range; and determining, by the base station, the actual available bandwidth in the spectrum range selected by the UE.

According to a second aspect, a communications method is provided, after a piece of user equipment UE establishes a connection with a base station according to a system bandwidth in a broadcast message, including:

receiving, by the UE, resource configuration that is sent by the base station by using dedicated signaling or a common message and used for communication between the UE and the base station, where the resource configuration is determined by the base station for the UE, and the resource configuration includes at least one of a resource allocation bandwidth, a channel state information CSI pilot bandwidth, and a CSI measurement bandwidth, where the resource allocation bandwidth is a bandwidth used to generate resource block allocation information in downlink control information; and communicating, by the UE, with the base station according to the resource configuration used for communication between the UE and the base station.

With reference to the second aspect, in a first possible implementation manner, if the resource configuration includes the resource allocation bandwidth, the communicating, by the UE, with the base station according to the resource configuration used for communication between the UE and the base station includes:

determining, by the UE according to the resource allocation bandwidth and resource allocation indication information of a physical data channel, a physical resource occupied by the physical data channel, where a logical channel carried by the physical data channel is a non-common logical channel.

With reference to the second aspect, in a second possible implementation manner, if the resource configuration includes the CSI pilot bandwidth, before the communicating, by the UE, with the base station according to the resource configuration used for communication between the UE and the base station, the method further includes:

receiving, by the UE, a CSI pilot bandwidth of the base station; and determining, by the UE according to the CSI pilot bandwidth configured for the UE by the base station and the CSI pilot bandwidth of the base station, a relative position, of the CSI pilot bandwidth configured for the UE by the base station, in the CSI pilot bandwidth of the base station, so as to intercept, according to the relative position from a CSI pilot sequence used by the base station, a CSI pilot sequence used by the UE; and the communicating, by the UE, with the base station according to the resource configuration used for communication between the UE and the base station is specifically:

performing, by the UE, CSI measurement in the CSI measurement bandwidth by using the intercepted CSI pilot sequence.

With reference to the second aspect, and/or the first possible implementation manner, and/or the second possible implementation manner, in a third possible implementation manner, if the resource configuration includes the CSI pilot bandwidth, and the CSI pilot bandwidth is a sounding reference signal SRS frequency domain resource, the SRS frequency domain resource and an uplink system bandwidth are independent from each other.

With reference to the third possible implementation manner, in a fourth possible implementation manner, if a CSI pilot is an uplink SRS, the receiving, by the UE, resource configuration that is sent by the base station by using dedicated signaling or a common message and used for communication between the UE and the base station includes:

receiving, by the UE, UE-level SRS bandwidth configuration $C_{SRS}$, an SRS bandwidth $B_{SRS}$, a frequency hopping bandwidth $b_{hop}$, and a frequency domain position $n_{RRC}$ that are configured for the UE by the base station; and the communicating, by the UE, with the base station according to the resource configuration used for communication between the UE and the base station includes:

determining, by the UE, an SRS frequency domain resource according to the UE-level $C_{SRS}$, the $B_{SRS}$, the $b_{hop}$, and the $n_{RRC}$; and communicating, by the UE, with the base station according to the SRS frequency domain resource.

With reference to the third possible implementation manner, in a fifth possible implementation manner, if a CSI pilot is an uplink SRS, the receiving, by the UE, resource configuration that is sent by the base station by using dedicated signaling or a common message and used for communication between the UE and the base station includes:

receiving, by the UE, an SRS allocation bandwidth $N_{RB,SRS}^{UL}$, UE-level or cell-level $C_{SRS}$, $B_{SRS}$, $b_{hop}$, and $n_{RRC}$ of the UE that are configured by the base station; and the communicating, by the UE, with the base station according to the resource configuration used for communication between the UE and the base station includes:

determining, by the UE, an SRS frequency domain resource according to the $N_{RB,SRS}^{UL}$, the UE-level or cell-level $C_{SRS}$, the $B_{SRS}$, the $b_{hop}$, and the $n_{RRC}$; and communicating, by the UE, with the base station according to the SRS frequency domain resource.

With reference to the second aspect, in a sixth possible implementation manner, if the resource configuration includes multiple CSI measurement bandwidths, the communicating, by the UE, with the base station according to the resource configuration used for communication between the UE and the base station includes:

independently performing, by the UE, CSI measurement in each CSI measurement bandwidth of the multiple CSI measurement bandwidths.

With reference to the second aspect, in a seventh possible implementation manner, when the method is applied to a multi-carrier scenario that includes at least a first carrier and a second carrier, the receiving, by the UE, resource configuration that is sent by the base station by using dedicated signaling or a common message and used for communication between the UE and the base station is specifically:

receiving, by the UE on the first carrier, the resource configuration, sent by the base station by using the dedicated signaling or the common message, of the UE on the first carrier; and the method further includes:

receiving, by the UE on the first carrier, scheduling information, sent by the base station by using the dedicated signaling or the common message, of the UE on the second carrier, where the scheduling information includes any one or any combination of a resource allocation bandwidth, a CSI pilot bandwidth, and a CSI measurement bandwidth, and frequency number information of the second carrier.

With reference to the seventh possible implementation manner, in an eighth possible implementation manner, the scheduling information further includes parameters for determining a signal waveform of the second carrier.

According to a third aspect, a base station is provided, including:

a determining unit, configured to: after a piece of user equipment UE establishes a connection with the base station according to a system bandwidth in a broadcast message, determine, for the user equipment, resource configuration used for communication between the UE and the base station, where the resource configuration includes at least one of a resource allocation bandwidth, a channel state information CSI pilot bandwidth, and a CSI measurement bandwidth, where the resource allocation bandwidth is a bandwidth used to generate resource block allocation information in downlink control information; and a sending unit, configured to send, to the UE by using dedicated signaling or a common message, the resource configuration that is determined for the UE and used for communication between the UE and the base station.

With reference to the third aspect, in a first possible implementation manner, the determining unit includes:

a first bandwidth determining subunit, configured to determine an actual available bandwidth of the UE; and a first resource determining subunit, specifically configured to determine, according to the actual available bandwidth of the UE, the resource configuration used for communication between the UE and the base station.

With reference to the first possible implementation manner, in a second possible implementation manner, the determining unit is specifically configured to: if the resource configuration includes the resource allocation bandwidth, determine that the actual available bandwidth is located within the resource allocation bandwidth; if the resource configuration includes the CSI pilot bandwidth, determine that the CSI pilot bandwidth is located within the actual available bandwidth; and if the resource configuration includes the CSI measurement bandwidth, determine that the CSI measurement bandwidth is located within the actual available bandwidth.

With reference to the third aspect, and/or the first possible implementation manner, and/or the second possible implementation manner, in a third possible implementation manner, the determining unit is specifically configured to: if the resource configuration includes the resource allocation bandwidth, determine a resource allocation bandwidth used by resource allocation indication information of a physical data channel, where a logical channel carried by the physical data channel is a non-common logical channel.

With reference to the third aspect, and/or the first possible implementation manner, and/or the second possible implementation manner, in a fourth possible implementation manner, the determining unit is specifically configured to: when the CSI pilot is an uplink sounding reference signal SRS, determine UE-level SRS bandwidth configuration $C_{SRS}$, an SRS bandwidth $B_{SRS}$, a frequency hopping bandwidth $b_{hop}$, and a frequency domain position $n_{RRC}$ of the UE, so that the UE determines an SRS frequency domain resource according to the UE-level $C_{SRS}$, the $B_{SRS}$, the $b_{hop}$, and the $n_{RRC}$; or determine an SRS allocation bandwidth $N_{RB,SRS}^{UL}$, UE-level or cell-level $C_{SRS}$, $B_{SRS}$, $b_{hop}$, and $n_{RRC}$ of the UE, so that the UE determines an SRS frequency domain resource according to the $N_{RB,SRS}^{UL}$, the UE-level or cell-level $C_{SRS}$, the $B_{SRS}$, the $b_{hop}$, and the $n_{RRC}$.

With reference to the third aspect, and/or the first possible implementation manner, and/or the second possible implementation manner, in a fifth possible implementation manner, the determining unit is specifically configured to determine multiple CSI measurement bandwidths, so that the UE independently performs CSI measurement in each CSI measurement bandwidth.

With reference to the third aspect, and/or the first possible implementation manner, and/or the second possible implementation manner, in a sixth possible implementation manner, when the base station is applied to a multi-carrier scenario that includes at least a first carrier and a second carrier, the determining unit is specifically configured to determine the resource configuration of the UE on the first carrier; and the determining unit is further configured to determine scheduling information of the UE on the second carrier, where the scheduling information includes any one or any combination of a resource allocation bandwidth, a CSI pilot bandwidth, and a CSI measurement bandwidth, and frequency number information of the second carrier.

With reference to the sixth possible implementation manner, in a seventh possible implementation manner, the determining unit includes:

a second bandwidth determining subunit, configured to: before the scheduling information of the UE on the second carrier is determined, determine an actual available bandwidth of the UE on the second carrier; and a second resource determining subunit, configured to determine the scheduling information of the UE on the second carrier according to the actual available bandwidth of the UE on the second carrier.

With reference to the seventh possible implementation manner, in an eighth possible implementation manner, the second bandwidth determining subunit includes:

a broadcasting subunit, configured to broadcast spectrum indication information;

a first receiving subunit, configured to receive a spectrum that is sent by the UE and selected by the UE based on the spectrum indication information broadcast by the base station; and a first determining subunit, configured to determine the received spectrum, selected by the UE, as the actual available bandwidth.

With reference to the seventh possible implementation manner, in a ninth possible implementation manner, the second bandwidth determining subunit includes:

a second receiving subunit, configured to receive a spectrum range that is sent by the UE and selected by the UE within an available spectrum range; and a second determining subunit, configured to determine the actual available bandwidth in the spectrum range selected by the UE.

According to a fourth aspect, a piece of user equipment is provided, including:

a receiving unit, configured to: after the user equipment UE establishes a connection with a base station according to a system bandwidth in a broadcast message, receive resource configuration that is sent by the base station by using dedicated signaling or a common message and used for communication between the UE and the base station, where the resource configuration is determined by the base station for the UE, and the resource configuration includes at least one of a resource allocation bandwidth, a channel state information CSI pilot bandwidth, and a CSI measurement bandwidth, where the resource allocation bandwidth is a bandwidth used to generate resource block allocation information in downlink control information; and a communications unit, configured to communicate with the base station according to the resource configuration used for communication between the UE and the base station.

With reference to the fourth aspect, in a first possible implementation manner, if the resource configuration includes the resource allocation bandwidth, the communications unit is configured to determine, according to the resource allocation bandwidth and resource allocation indication information of a physical data channel, a physical resource occupied by the physical data channel, where a logical channel carried by the physical data channel is a non-common logical channel.

With reference to the fourth aspect, in a second possible implementation manner, the user equipment further includes:

an information receiving unit, configured to: when the resource configuration includes the CSI pilot bandwidth, before the communications unit communicates with the base station according to the resource configuration configured by the base station, receive a CSI pilot bandwidth of the base station; and a sequence acquisition unit, configured to determine, according to the CSI pilot bandwidth configured for the UE by the base station and the CSI pilot bandwidth of the base station, a relative position, of the CSI pilot bandwidth configured for the UE by the base station, in the CSI pilot bandwidth of the base station, so as to intercept, according to the relative position from a CSI pilot sequence used by the base station, a CSI pilot sequence used by the UE, where the communications unit is specifically configured to perform CSI measurement in the CSI measurement bandwidth by using the intercepted CSI pilot sequence.

With reference to the fourth aspect, in a third possible implementation manner, the receiving unit is specifically configured to: when the CSI pilot is an uplink sounding reference signal SRS, receive UE-level SRS bandwidth configuration $C_{SRS}$, an SRS bandwidth $B_{SRS}$, a frequency hopping bandwidth $b_{hop}$, and a frequency domain position $n_{RRC}$ that are configured for the UE by the base station; and the communications unit includes:

a first determining subunit, configured to determine an SRS frequency domain resource according to the UE-level $C_{SRS}$, the $B_{SRS}$, the $b_{hop}$, and the $n_{RRC}$; and a first communications subunit, configured to communicate with the base station according to the SRS frequency domain resource determined by the first determining subunit.

With reference to the fourth aspect, in a fourth possible implementation manner, the receiving unit is configured to: when the CSI pilot is an uplink SRS, receive an SRS allocation bandwidth $N_{RB,SRS}^{UL}$, UE-level or cell-level $C_{SRS}$, $B_{SRS}$, $b_{hop}$, and $n_{RRC}$ of the UE that are configured by the base station; and the communications unit includes:

a second determining subunit, configured to determine an SRS frequency domain resource according to the $N_{RB,SRS}^{UL}$, the UE-level or cell-level $C_{SRS}$, the $B_{SRS}$, the $b_{hop}$, and the $n_{RRC}$; and a second communications subunit, configured to communicate with the base station according to the SRS frequency domain resource determined by the second determining subunit.

With reference to the fourth aspect, in a fifth possible implementation manner, the communications unit is specifically configured to: when the resource configuration includes multiple CSI measurement bandwidths, independently perform CSI measurement in each CSI measurement bandwidth of the multiple CSI measurement bandwidths.

With reference to the fourth aspect, in a sixth possible implementation manner, the receiving unit is configured to: when the user equipment is applied to a multi-carrier scenario that includes at least a first carrier and a second carrier, receive, on the first carrier, the resource configuration, sent by the base station by using the dedicated signaling or the common message, of the UE on the first carrier; and receive, on the first carrier, scheduling information, sent by the base station by using the dedicated signaling or the common message, of the UE on the second carrier, where the scheduling information includes any one or any combination of a resource allocation bandwidth, a CSI pilot bandwidth, and a CSI measurement bandwidth, and frequency number information of the second carrier.

In the embodiments of the present invention, after a UE establishes a connection with a base station, the base station reconfigures a radio resource for the UE, so that the radio resource is effectively and fully used.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

To make a person skilled in the art understand the technical solutions in the embodiments of the present invention better, and make the objectives, features, and advantages of the embodiments of the present invention clearer, the following further describes the technical solutions in the embodiments of the present invention in detail with reference to the accompanying drawings.

In this specification, a bandwidth refers to a frequency band, and may include a width of the frequency band and a location of the frequency band in a given spectrum; or may also refer to the width of the frequency band.

In many scenarios, there is a case in which an actual available bandwidth is inconsistent with a system bandwidth, for example:

(1) FDM ICIC

Base stations coordinate with each other to divide a whole system bandwidth into several parts, and an edge UE of each cell works on one or multiple spectrum resources thereof, so as to implement inter-cell interference coordination in an FDM manner. However, in this working manner, it is still required to use a downlink pilot signal of the whole system bandwidth to perform measurement on channel state information, which is inconsistent with interference information of an actual data channel.

(2) Non-Standard Spectrum

The existing 3GPP LTE Rel. 10 standard defines several standard bandwidth values. For detailed information, refer to 3GPP 36.101 or 3GPP 36.104. However, a scenario of a non-standard spectrum exists during actual network deployment. For example, an available spectrum is 8M; deployment of a 5M LTE system results in a waste of spectrum resources, and if a 10M LTE system is deployed, the system probably cannot work normally because of adjacent-frequency interference.

(3) Capability Difference Between UEs

A great requirement for different terminal specifications is derived from actual communication scenarios, and it is difficult for a single terminal specification to satisfy, for example, a demand, in Internet of Things communication, which is characterized in that small-data-amount communication, instead of broadband communication, is mostly performed between a terminal and a network. In addition, deployment of a large number of Internet of Things terminals also requires a large number of low-cost terminals. By comparing an Internet of Things terminal with an existing broadband communications terminal, both of them obviously have different communication requirements and specifications, and therefore, different definitions of UE capabilities are generated.

Certainly, there are other scenarios in which an actual available bandwidth is inconsistent with a system bandwidth, which are not enumerated herein. For these scenarios, the embodiments of the present invention provide a radio resource configuration method and a device, so that a radio resource can be effectively and fully used.

Figure 1:
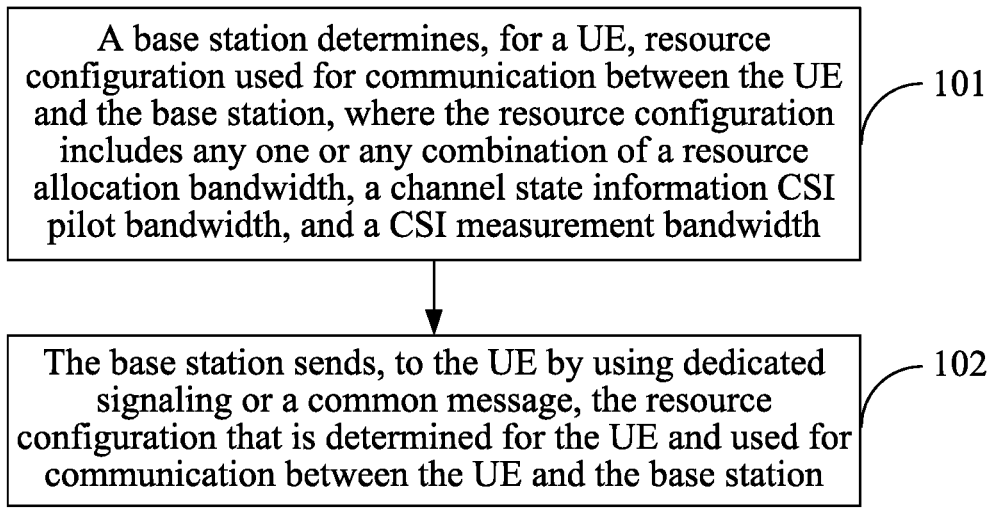
FIG. 1 is a flowchart of a radio resource configuration method according to an embodiment of the present invention.

Refer to FIG. 1, which is a flowchart of a radio resource configuration method according to an embodiment of the present invention.

The method may include:

Step 101: A base station determines, for a UE, resource configuration used for communication between the UE and the base station, where the resource configuration includes any one or any combination of a resource allocation bandwidth, a channel state information CSI pilot bandwidth, and a CSI measurement bandwidth.

Before the base station performs step 101, the base station broadcasts a system bandwidth used by a cell in which the UE is located, and the UE establishes an RRC connection with the base station according to the system bandwidth broadcast by the base station. In this case, a resource allocation bandwidth, a channel state information (Channel State Information, CSI) pilot bandwidth, and a CSI measurement bandwidth that are used by the UE are all limited within a range of the system bandwidth; and the system bandwidth is used as a default value.

In this embodiment of the present invention, in the foregoing scenarios in which an actual available bandwidth of the UE is inconsistent with the system bandwidth (or in another scenario, which is not specifically limited herein), after the UE establishes the RRC connection with the base station, the base station may perform this step to determine the resource configuration for the UE.

In this step, the base station determines, for the UE, the resource configuration used for communication between the UE and the base station, where the resource configuration includes at least one of the resource allocation bandwidth, the CSI pilot bandwidth, and the CSI measurement bandwidth, where the resource allocation bandwidth is a bandwidth used to generate resource block allocation information in downlink control information (Downlink Control Information, DCI), the CSI pilot bandwidth is a bandwidth used to transmit a CSI pilot, and the CSI measurement bandwidth is a bandwidth used for CSI measurement. In this embodiment of the present invention, unless specially noted, each of the foregoing bandwidths may include an uplink bandwidth and/or a downlink bandwidth. For example, the resource allocation bandwidth may include an uplink resource allocation bandwidth and/or a downlink resource allocation bandwidth, the CSI pilot bandwidth may include an uplink CSI pilot bandwidth and/or a downlink CSI pilot bandwidth, and the CSI measurement bandwidth may only include a downlink CSI measurement bandwidth.

The resource allocation bandwidth, the CSI pilot bandwidth, and the CSI measurement bandwidth may have different bandwidth values, and each bandwidth value and a value of the system bandwidth may be independent from each other.

Step 102: The base station sends, to the UE by using dedicated signaling or a common message, the resource configuration that is determined for the UE and used for communication between the UE and the base station.

The common message may be a system message for all UEs, or may be a UE-type common message for users of a type; and the dedicated signaling may be an RRC reconfiguration message or the like.

In this embodiment of the present invention, after a UE establishes a connection with a base station, the base station re-determines resource configuration for the UE, so that a radio resource is effectively and fully used. This method can be applicable to many scenarios, which are, for example but are not limited to, FDM ICIC, a non-standard spectrum, and a capability difference between UEs.

In an embodiment of the embodiments of the present invention, a process of determining, by the base station, the resource allocation bandwidth, the channel state information CSI pilot bandwidth, and the CSI measurement bandwidth of the UE may be as follows:

(1) Resource Allocation Bandwidth

In the existing 3GPP LTE Rel. 11 standard, a value of the resource allocation bandwidth is equal to a value of the system bandwidth. Resource block (Resource Block, RB) allocation indications included in DCI information that is carried in a physical downlink control channel (Physical Downlink Control Channel, PDCCH), an enhanced PDCCH (Enhanced PDCCH, EPDCCH), or the like and received by the UE are all calculated based on the resource allocation bandwidth. For detailed content of the resource allocation method, refer to chapters such as 3GPP 36.213 Rel. 11 7.1.6 and 8.1.

In this embodiment of the present invention, resource allocation bandwidths corresponding to data channels of different types may be different. If a logical channel carried by a current physical data channel (a PDSCH or a PUSCH) is at least one of a common control channel (Common Control Channel, CCCH), a paging control channel (Paging Control Channel, PCCH), a broadcast control channel (Broadcast Control Channel, BCCH), a multicast traffic channel (Multicast Traffic Channel, MTCH), and a multicast control channel (Multicast Control Channel, MCCH), or a common logical channel of another type, a resource allocation bandwidth, in scheduling information of the data channel, that is used to indicate physical resource allocation is still the system bandwidth; otherwise, if the logical channel carried by the current physical data channel is a non-common logical channel, the resource allocation bandwidth is the resource allocation bandwidth configured for the UE by the base station in step 102. For definition of the logical channel, refer to 3GPP 36.300. In this embodiment of the present invention, a value of the resource allocation bandwidth and the value of the system bandwidth are independent from each other, where the resource allocation bandwidth is a UE-specific configuration parameter and is mainly corresponding to a physical data channel that carries a non-common logical channel.

Optionally, a size of a resource block group (Resource Block Group, RBG) that needs to be used in resource allocation information of the physical data channel that carries the non-common logical channel is determined by the system bandwidth.

(2) CSI Pilot Bandwidth

The CSI pilot bandwidth is a UE-specific configuration parameter, and the CSI pilot especially refers to a reference signal used for channel state information CSI measurement. The CSI pilot may include reference signals such as a non-zero power CSI reference signal (Non-Zero Power CSI Reference Signal, NZP CSI-RS), a zero power CSI reference signal (Zero Power CSI Reference Signal, ZP CSI-RS), a cell specific reference signal (Cell Specific Reference Signal, CRS), a sounding reference signal (Sounding Reference Signal, SRS) that are defined in an existing standard, and at least one of other reference signals that may be used for CSI measurement. In this embodiment of the present invention, a value of the CSI pilot bandwidth and the value of the system bandwidth are independent from each other.

In an embodiment of the embodiments of the present invention, after configuring the CSI pilot bandwidth for the UE, the base station may further notify the UE of a CSI pilot bandwidth used by the base station, so that the UE can determine, according to the CSI pilot bandwidth configured for the UE by the base station and the CSI pilot bandwidth of the base station, a relative position, of the CSI pilot bandwidth configured for the UE by the base station, in the CSI pilot bandwidth of the base station, so as to intercept, according to the relative position from a CSI pilot sequence used by the base station, a CSI pilot sequence used by the UE.

In this embodiment of the present invention, it is possible that a spectrum bandwidth and a CSI pilot bandwidth that are actually used on the side of the base station are inconsistent with a spectrum bandwidth actually used on the side of the UE and a CSI pilot bandwidth used by the UE. Unless specially noted, the resource allocation bandwidth, the CSI pilot bandwidth, and the CSI measurement bandwidth that are mentioned in this embodiment of the present invention all refer to bandwidth values configured for the UE by the base station, and are not bandwidth values used on the side of the base station.

In another embodiment of the embodiments of the present invention, if the CSI pilot is an uplink SRS reference signal, the value of the CSI pilot bandwidth (namely, an SRS frequency domain resource) configured for the UE by the base station and the value $N_{RB}^{UL}$ of the system bandwidth are independent from each other. Parameters for determining an SRS frequency domain resource in the existing protocol 3GPP LTE Rel. 11 include a cell-level parameter SRS bandwidth configuration (srs-BandwidthConfig, $C_{SRS}$), and UE-level parameters an SRS bandwidth (srs-Bandwidth, $B_{SRS}$), a frequency domain position (freqDomainPosition, $n_{RRC}$), a frequency hopping bandwidth (srs-HoppingBandwidth, $b_{hop}$), and the like. The UE determines the SRS frequency domain resource by using the parameters and the system bandwidth $N_{RB}^{UL}$. For details, refer to the chapter 3GPP 36.211 5.5.3.

In this embodiment of the present invention, mutual independence between the SRS frequency domain resource and the system bandwidth N may be specifically implemented in the following two manners:

Manner 1: The base station configures the UE-level SRS bandwidth configuration $C_{SRS}$ for the UE.

The UE determines the SRS frequency domain resource according to the UE-level $C_{SRS}$ configured for the UE by the base station and other parameters such as $B_{SRS}$, $b_{hop}$, and $n_{RRC}$. In this embodiment of the present invention, an optional manner of defining $C_{SRS}$ is shown in the following table. Compared with an existing standard, $C_{SRS}$ has a larger indication range, for example, may be indicated by 4 bits or 5 bits. Meanings of parameters $m_{SRS,j}$, $N_j$, j=1, 2, 3 in the following table are the same as meanings of parameters in the existing standard 3GPP 36.211 5.5.3. In addition, the uplink system bandwidth N and the SRS frequency domain resource are independent from each other.

| | $B_{SRS}=0$ | | $B_{SRS}=1$ | | $B_{SRS}=2$ | | $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |
| 8 | 40 | 1 | 20 | 2 | 4 | 5 | 4 | 1 |
| 9 | 36 | 1 | 12 | 3 | 4 | 3 | 4 | 1 |
| 10 | 32 | 1 | 16 | 2 | 8 | 2 | 4 | 2 |
| 11 | 24 | 1 | 4 | 6 | 4 | 1 | 4 | 1 |
| 12 | 20 | 1 | 4 | 5 | 4 | 1 | 4 | 1 |
| 13 | 16 | 1 | 4 | 4 | 4 | 1 | 4 | 1 |
| 14 | 12 | 1 | 4 | 3 | 4 | 1 | 4 | 1 |
| 15 | 8 | 1 | 4 | 2 | 4 | 1 | 4 | 1 |
| 16 | 4 | 1 | 4 | 1 | 4 | 1 | 4 | 1 |

Manner 2: The base station configures an SRS allocation bandwidth $N_{RB,SRS}^{UL}$ for the UE.

The SRS allocation bandwidth $N_{RB,SRS}^{UL}$ herein corresponds to the uplink system bandwidth $N_{RB}^{UL}$ in an existing LTE standard. The chapter 36.211 5.5.3.2 in an existing protocol defines multiple tables with different $N_{RB}$ values, including tables 5.5.3.2-1, 5.5.3.2-2, 5.5.3.2-3, 5.5.3.2-4, and the like. In this embodiment of the present invention, these tables may be reused, and selection is performed among the tables according to a value of $N_{RB,SRS}^{UL}$. A UE determines an SRS frequency domain resource of the UE by using the parameters $C_{SRS}$, $B_{SRS}$, $b_{hop}$, $n_{RRC}$, and the like that are configured by the base station, and according to the selected table. Herein, $C_{SRS}$ may be a cell-level parameter, or may be a UE-specific configuration parameter.

(3) CSI Measurement Bandwidth

The CSI measurement bandwidth is also a UE-specific configuration parameter. A user performs CSI measurement on a CSI reference signal in a specific location of the configured CSI pilot bandwidth according to the configured CSI measurement bandwidth. The UE performs PMI (Precoding Matrix Indicator) measurement, CQI (Channel Quality Indicator) measurement, RI (Rank Indicator) measurement, and the like within a range of the CSI measurement bandwidth. For definitions of PMI/CQI/RI and the like, refer to 3GPP 36.213. The base station may configure multiple CSI measurement bandwidths for the UE, and the UE independently performs CSI measurement in each CSI measurement bandwidth. Each defined CSI measurement bandwidth falls within a range of the CSI pilot bandwidth. In this embodiment of the present invention, a value of the CSI measurement bandwidth and the value of the system bandwidth are independent from each other.

In this embodiment of the present invention, a base station re-determines resource configuration for a UE, so that a radio resource is effectively and fully used.

In another embodiment, the method in this embodiment of the present invention not only can be applicable to a single-carrier scenario, but also can be applicable to a multi-carrier scenario that includes at least a first carrier and a second carrier. In the multi-carrier scenario, a process of determining, by the base station, the resource configuration for the UE is specifically:

determining, by the base station, the resource configuration of the UE on the first carrier.

The method may further include:

determining, by the base station, scheduling information of the UE on the second carrier, where the scheduling information includes at least one of a resource allocation bandwidth, a CSI pilot bandwidth, and a CSI measurement bandwidth, and frequency number information of the second carrier. The scheduling information may further include parameters for determining a signal waveform of the second carrier, such as a multiple access manner and an air interface parameter (for example, a distribution mode of reference signals and a frame structure).

In this embodiment of the present invention, when the base station configures any resource of the resource allocation bandwidth, the CSI pilot bandwidth, and the CSI measurement bandwidth for the UE, in both the single-carrier scenario and the multi-carrier scenario, configuration methods are similar.

In another embodiment of the embodiments of the present invention, a process of determining, by the base station for the UE, the resource configuration used for communication between the UE and the base station may include:

determining, by the base station, an actual available bandwidth of the UE.

The base station may determine the actual available bandwidth of the UE according to a bandwidth condition of the base station or that of a neighboring base station, or may directly determine the actual available bandwidth of the UE according to a spectrum resource reported by the UE, or may determine the actual available bandwidth of the UE according to a spectrum resource selected by the UE and with reference to a bandwidth condition of the base station, or may determine the actual available bandwidth of the UE according to an access process difference of the UE or a UE capability reported by the UE. The actual available bandwidth may be greater than the system bandwidth or may be less than the system bandwidth, and is independent from the system bandwidth.

Optionally, when the base station determines the resource configuration for the UE according to the actual available bandwidth of the UE, a configuration process is similar to the configuration processes in the foregoing (1), (2), and (3), and a difference only lies in limitation on a specific value of each bandwidth. If the resource configuration includes the resource allocation bandwidth, the resource allocation bandwidth is configured to include the actual available bandwidth, that is, the actual available bandwidth is made to be located within the resource allocation bandwidth. If the resource configuration includes the channel state information CSI pilot bandwidth, the CSI pilot bandwidth is configured to be within the actual available bandwidth. If the resource configuration includes the CSI measurement bandwidth, the CSI measurement bandwidth is configured to be within the actual available bandwidth.

In the case of the single-carrier scenario, the base station directly determines an actual available bandwidth of the UE on a current carrier. In the multi-carrier scenario, for example, in a scenario that includes a first carrier and a second carrier, the base station may separately determine an actual available bandwidth of the UE on the first carrier and an actual available bandwidth of the UE on the second carrier. The base station then separately determines resource configuration on the first carrier for the UE according to the actual available bandwidth on the first carrier, and determines resource configuration on the second carrier for the UE according to the actual available bandwidth on the second carrier.

In another embodiment, the base station may also directly determine the resource configuration of the UE according to a UE capability, or may perform determining according to other parameters, which is not specifically limited.

In this embodiment of the present invention, a base station re-determines resource configuration for a UE, so that a radio resource is effectively and fully used.

Figure 2A:
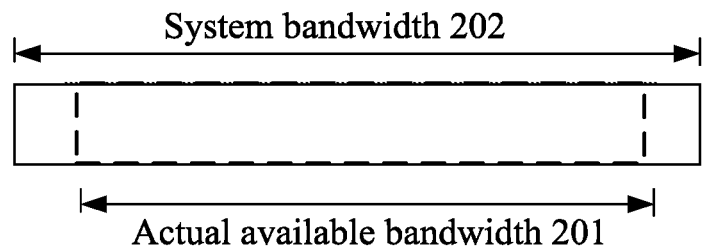
FIG. 2a to FIG. 2b are schematic diagrams showing that a base station determines resource configuration for a UE according to a first embodiment of the embodiments of the present invention.
Figure 2B:
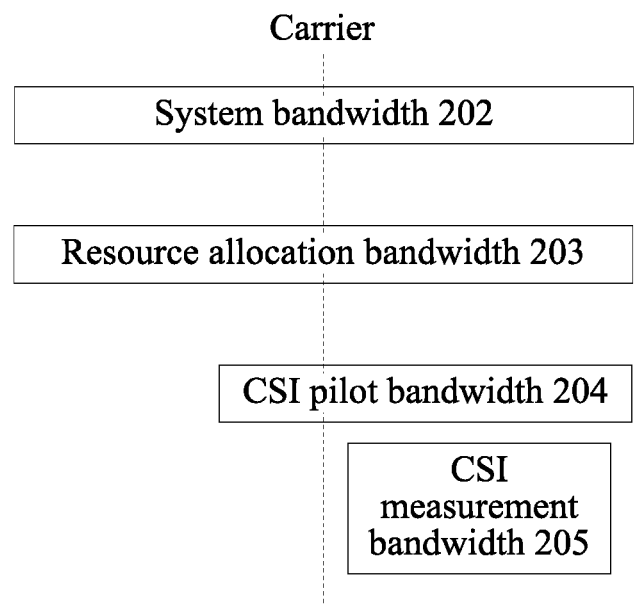

In an embodiment, if an actual available bandwidth 201 of the UE determined by the base station is not greater than a system bandwidth 202 broadcast by the base station, as shown in FIG. 2a to FIG. 2b:

after the UE establishes the connection with the base station, the base station configures, for the UE by means of signaling configuration, the resource configuration used for communication between the UE and the base station, where signaling may be dedicated signaling, broadcast signaling, or the like. The resource configuration may be specifically as follows:

A value of a resource allocation bandwidth 203 is not less than that of the system bandwidth 202, the actual available bandwidth 201 of the UE is located within the resource allocation bandwidth 203, and a default value of the resource allocation bandwidth 203 may be equal to the value of the system bandwidth 202;

a CSI pilot bandwidth 204 is configured to be within the actual available bandwidth 201, namely, located within the resource allocation bandwidth 203; a specific value of the CSI pilot bandwidth may be selectively configured by the base station; and a default value of the CSI pilot bandwidth 204 may be equal to the value of the resource allocation bandwidth 203; and a CSI measurement bandwidth 205 falls within a range of the CSI pilot bandwidth 204, a specific value of the CSI measurement bandwidth may be determined by the base station, and a default value is equal to the value of the CSI pilot bandwidth 204.

Figure 3A:
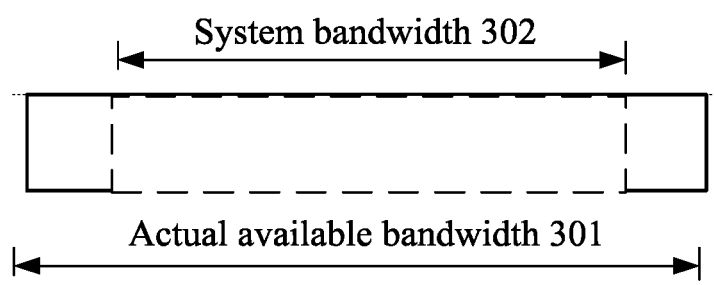
FIG. 3a to FIG. 3b are schematic diagrams showing that a base station determines resource configuration for a UE according to a second embodiment of the embodiments of the present invention.
Figure 3B:
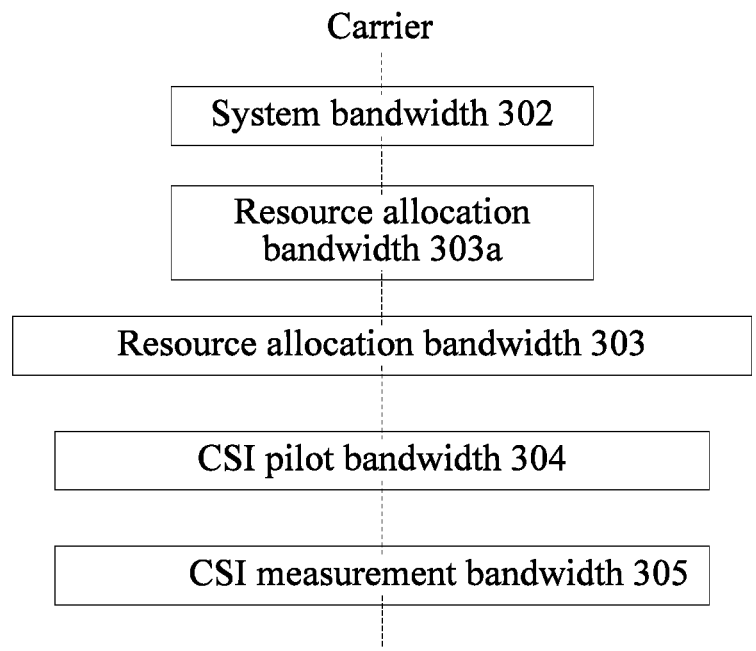

In another embodiment, if an actual available bandwidth 301 of the UE determined by the base station is not less than a system bandwidth 302, as shown in FIG. 3a to FIG. 3b:

Before the base station configures, for the UE, a resource allocation bandwidth 303 matching the actual available bandwidth 301, a resource allocation bandwidth 303a jointly used by the base station and the UE uses a value of the system bandwidth 302 as a default value. The base station configures, by means of signaling configuration, the resource configuration used for communication between the UE and the base station, where the resource configuration may specifically include that:

the resource allocation bandwidth 303 includes the actual available bandwidth 301;

a CSI pilot bandwidth 304 falls within a range of the actual available bandwidth 301, and may be selectively configured by the base station; and a default value is equal to a value of the resource allocation bandwidth 303; and a CSI measurement bandwidth 305 falls within a range of the CSI pilot bandwidth 304, and may be selectively configured by the base station; and a default value is equal to a value of the CSI pilot bandwidth 304.

Figure 4:
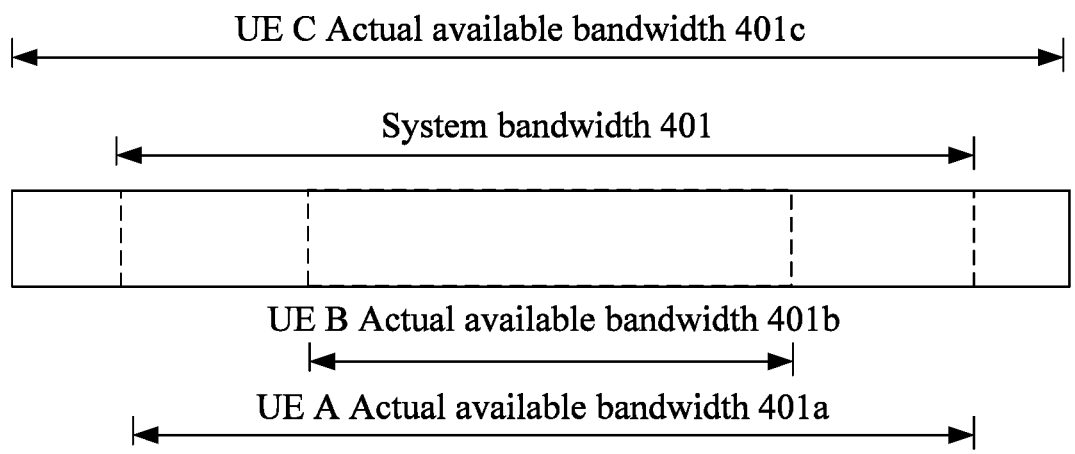
FIG. 4 is a schematic diagram showing that a base station determines resource configuration for a UE according to a third embodiment of the embodiments of the present invention.

In another embodiment, as shown in FIG. 4:

Because different UEs that access a same carrier have different capabilities, actual available bandwidths of the UEs vary from one another to some extent. For example, as shown in FIG. 4, A, B, and C are three UEs with different capabilities; and a UE capability of each UE may be determined by the base station according to an access process of the UE, or may be reported to the base station by the UE. An actual available bandwidth 401a of UE A is equal to a system bandwidth 401, and UE A only supports resource configuration that is determined according to the system bandwidth 401 and can be used for communication between the UE A and the base station. A limited capability of UE B determines that an actual available bandwidth 401b of UE B is less than the system bandwidth 401. UE C has a relatively high capability and has an actual available bandwidth 401c greater than the system bandwidth 401, and supports resource configuration re-determined for UE C by a network. For a process of configuring, by the base station, working spectrums for UE A and UE C, refer to the foregoing embodiments shown in FIG. 2a, FIG. 2b, FIG. 3a and FIG. 3b. Configuration for UE B is specifically as follows:

a resource allocation bandwidth is not less than the actual available bandwidth 401b, and a default value is the actual available bandwidth 401b determined and defined according to the capability of UE B.

Because the actual available bandwidth 401b defined according to the capability of UE B is limited, whether the base station configures a CSI pilot bandwidth and a CSI measurement bandwidth for UE B is related to a characteristic of whether UE B needs to perform CSI measurement, which therefore may be implemented in the following two manners:

In manner 1, it is assumed that UE B does not need to perform CSI channel state information measurement.

In this case, the base station does not need to perform parameter configuration for the CSI measurement bandwidth and the CSI pilot bandwidth.

The base station needs to notify UE B of a pilot resource location used by another UE within a range of the actual available bandwidth 401b of UE B, and the UE B does not acquire a signal from the resource location when receiving downlink data from the base station. Alternatively, when implementing resource mapping of UE B, the side of the base station does not consider a resource location, that is occupied by a pilot signal used by another UE, within a receiving bandwidth of UE B; and after the resource mapping is completed, puncturing is performed on the pilot resource location; and on the side of UE B, it is also considered that UE B also performs data transmission on the pilot resource location within a resource allocation indication range of UE B.

In manner 2, it is assumed that UE B needs to perform CSI channel state information measurement.

A configured CSI pilot bandwidth falls within the actual available bandwidth 401b and may be selectively configured by the base station, and a default value is equal to a value of the actual available bandwidth 401b.

A configured CSI measurement bandwidth falls within the CSI pilot bandwidth, and may be selectively configured by the base station; and a default value is equal to a value of the CSI pilot bandwidth.

Figure 5:
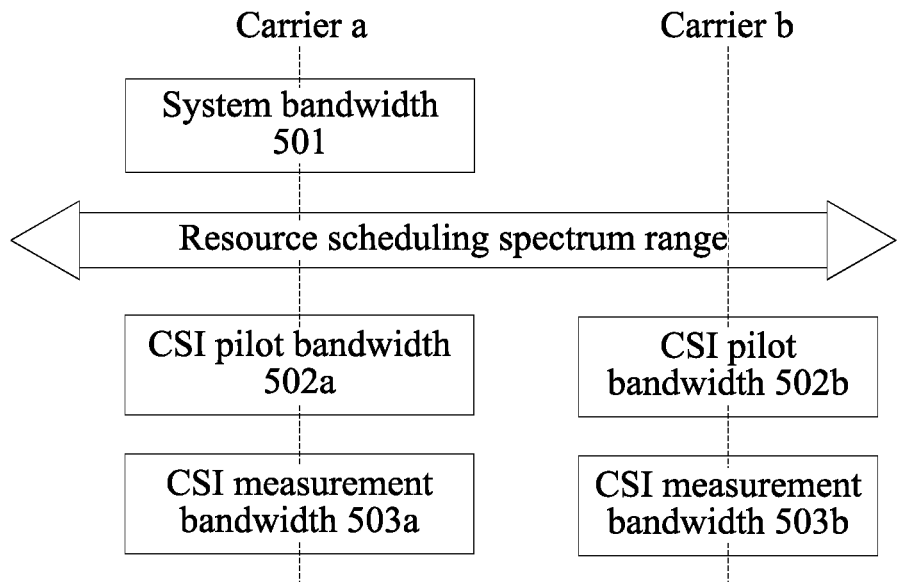
FIG. 5 is a schematic diagram showing that a base station determines resource configuration for a UE according to a fourth embodiment of the embodiments of the present invention.

In another embodiment, as shown in FIG. 5, in the multi-carrier scenario:

the UE maintains communication with the base station on a current first carrier (a carrier a), and the base station may determine, for the UE, resource configuration on the carrier a, such as a CSI pilot bandwidth 502a and a CSI measurement bandwidth 503a, where a configuration method is similar to that in the foregoing embodiments. The UE receives, within a system bandwidth 501, the resource configuration on the carrier a, where the resource configuration is determined for the UE by the base station.

In this embodiment, the base station may further send, on the first carrier (the carrier a) according to a current network environment, scheduling information of a user on a second carrier (a carrier b). The scheduling information indicates resource configuration used by the user on the carrier b, and the scheduling information may include at least one of a CSI pilot bandwidth 502b, a CSI measurement bandwidth 503b, and the like, frequency number information of the carrier b (for example, EARFCN or Band information defined in the 3GPP 36.101, a frequency shift and a shift direction of the carrier b relative to the carrier a, or a frequency number indication manner in another form), physical resource allocation information of a data channel, and the like. A frequency number of the carrier b is a basis used by a user to determine resource allocation of a data channel, the CSI pilot bandwidth 502b, the CSI measurement bandwidth 503b, and the like.

According to the scheduling information, that is obtained on the carrier a, of the carrier b, the UE receives data on the carrier b after a delay time indicated by the user in resource configuration or a fixed delay time, where a starting time point of the delay time is a corresponding time, a frame, or a subframe at/in which the UE receives the scheduling information.

Before the base station determines the resource configuration on the carrier b, the method may further include: first determining, by the base station, an actual available bandwidth of the UE on the second carrier, and then determining, by the base station, the resource configuration of the UE on the second carrier according to the actual available bandwidth of the UE on the second carrier.

Figure 6:
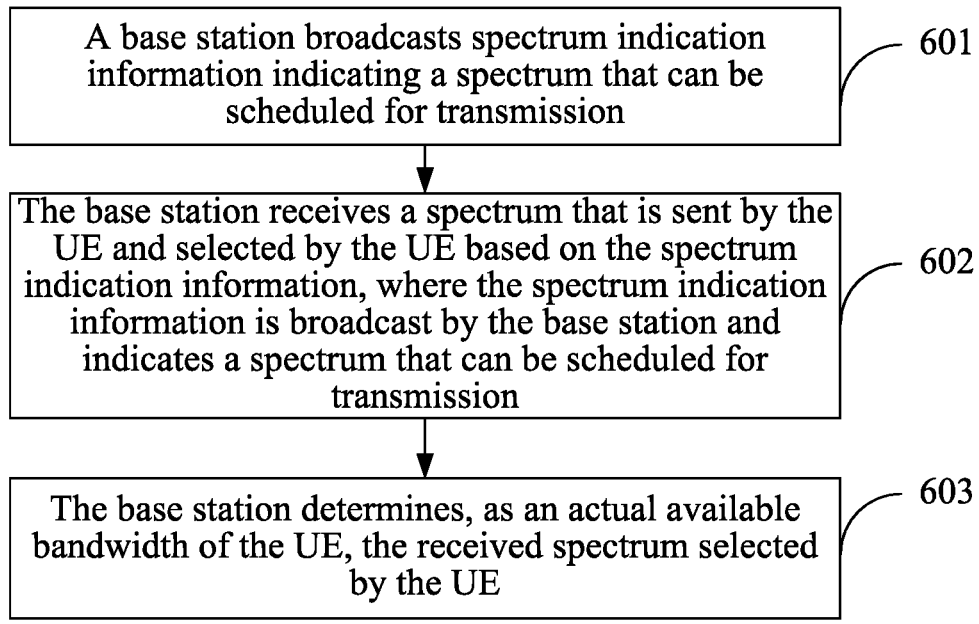
FIG. 6 is a flowchart of a method for determining, by a base station, an actual available bandwidth of a UE on a second carrier according to the embodiment shown in FIG. 5.

A process of determining, by the base station, the actual available bandwidth of the UE on the second carrier may include:

As shown in FIG. 6, manner 1 may include:

Step 601: The base station broadcasts spectrum indication information.

The indication information indicates a spectrum that can be scheduled for transmission by the base station and a resource scheduling range of the base station; and the spectrum indication information may include a dedicated spectrum range that belongs to an operator, and/or a spectrum range used with limitation, and/or resources used without limitation. The dedicated spectrum range refers to that the spectrum range can only be used by a network device of a specific operator, and cannot be used by a network device of another operator. The spectrum range used with limitation refers to that the spectrum range is not dedicatedly used by the operator and includes a spectrum that can be used under certain circumstances. The resources used without limitation refer to that the spectrum is a non-dedicated spectrum shared by multiple network operators.

After receiving the broadcast information, the UE selects a part or the whole of the spectrum as an available spectrum of the UE according to a capability of the UE, a channel status, and the like; and reports the selection result to the base station.

Step 602: The base station receives a spectrum that is sent by the UE and selected by the UE based on the spectrum indication information, where the spectrum indication information is broadcast by the base station and indicates a spectrum that can be scheduled for transmission.

Step 603: The base station determines the received spectrum, selected by the UE, as the actual available bandwidth of the UE.

Figure 7:
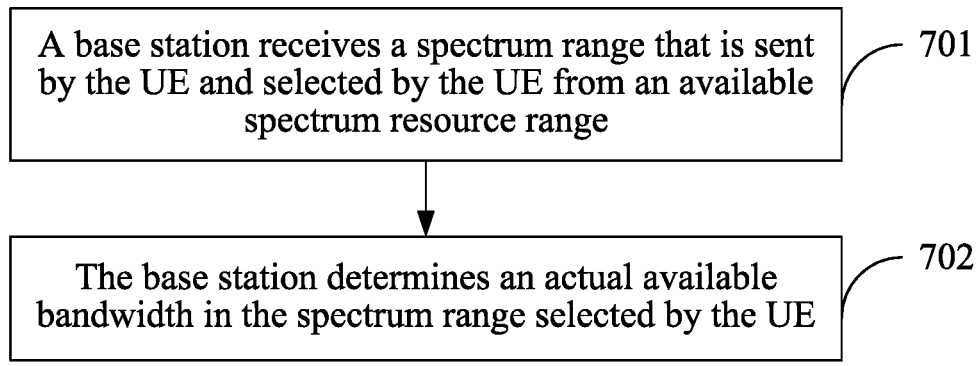
FIG. 7 is a flowchart of another method for determining, by a base station, an actual available bandwidth of a UE on a second carrier according to the embodiment shown in FIG. 5.

As shown in FIG. 7, manner 2 may include:

Step 701: The base station receives a spectrum range that is sent by the UE and selected by the UE within an available spectrum range.

The UE selects, within an available spectrum resource range determined according to a capability of the UE, a part or the whole of a spectrum range as an available spectrum determined according to the capability of the UE; and reports the selection result to the base station.

An available spectrum range determined according to the capability of the UE, namely, a spectrum selected by the UE within the available spectrum resource range of the UE, includes a dedicated spectrum range of an operator to which the UE belongs, and/or a spectrum range used with limitation, and/or a spectrum range used without limitation.

Step 702: The base station determines an actual available bandwidth in the spectrum range selected by the UE.

The base station selects a part or the whole of a spectrum as the actual available bandwidth of the UE according to a reporting result of the UE. A spectrum range that can be scheduled for transmission by the base station determines a resource scheduling range of the base station, and the actual available bandwidth of the UE falls within the resource scheduling range of the base station.

In addition, communication manners or multiple access manners of the carrier a and the carrier b may be independent from each other, and different multiple access manners may be used. For example, a communication manner on the carrier a is LTE, and another standard such as WCDMA (TD-SCDMA) is used as a communication manner on the carrier b. The carrier a and the carrier b may also use different air interface parameters, for example, frame structures, reference signal patterns, and the like. Therefore, the scheduling information, acquired by the UE on the carrier a, of the carrier b may further include parameters for determining a signal waveform of the carrier b, such as a multiple access manner and an air interface parameter.

Figure 8:
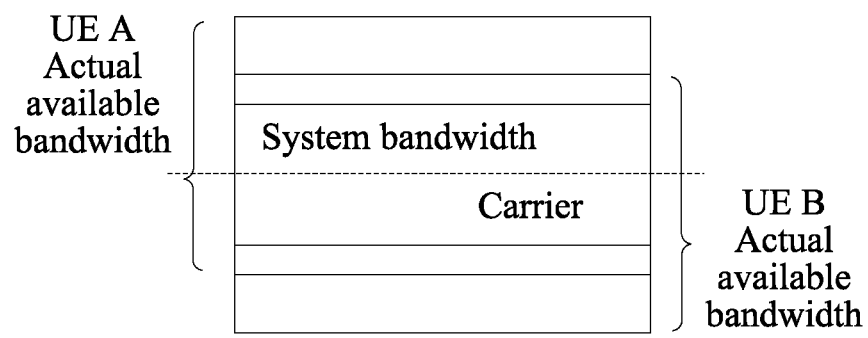
FIG. 8 is a schematic diagram showing that a base station determines resource configuration for a UE according to a fifth embodiment of the embodiments of the present invention.

In another embodiment, as shown in FIG. 8:

If an actual available bandwidth of the UE that is determined by the base station is not less than a system bandwidth, resource configuration determined for the UE by the base station may be specifically as follows:

a resource allocation bandwidth includes the actual available bandwidth, the system bandwidth is always within the resource allocation bandwidth, and the resource allocation bandwidth may be asymmetrical relative to a center frequency used by the system bandwidth;

a configured CSI pilot bandwidth falls within the actual available bandwidth, and may be selectively configured by the base station; and a default value is equal to a value of the resource allocation bandwidth; and a configured CSI measurement bandwidth falls within a range of the CSI pilot bandwidth, and may be selectively configured by the base station; and a default value is equal to a value of the CSI pilot bandwidth.

Radio resources allocated to different UEs may overlap, as shown in FIG. 8.

Figure 9:
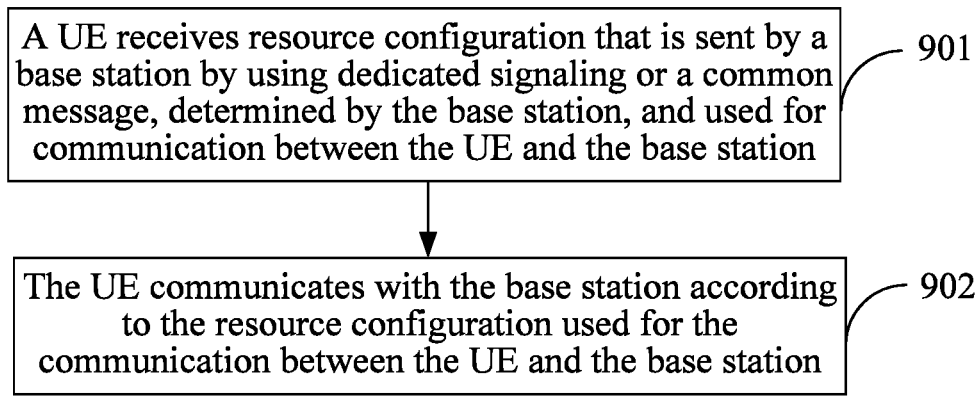
FIG. 9 is a flowchart of a communications method according to an embodiment of the present invention.

Refer to FIG. 9, which is a flowchart of a communications method according to an embodiment of the present invention.

The method may include:

Step 901: A UE receives resource configuration that is sent by a base station by using dedicated signaling or a common message, determined by the base station, and used for communication between the UE and the base station.

After establishing a connection with the base station according to a system bandwidth in a broadcast message, the UE receives the resource configuration sent by the base station, where the resource configuration includes at least one of a resource allocation bandwidth, a channel state information CSI pilot bandwidth, and a CSI measurement bandwidth, where the resource allocation bandwidth is a bandwidth used to generate resource block allocation information in downlink control information.

Step 902: The UE communicates with the base station according to the resource configuration used for communication between the UE and the base station.

In this embodiment of the present invention, after the UE establishes the connection with the base station, the UE receives a radio resource configured by the base station, and communicates with the base station by using the radio resource, so that the radio resource is effectively and fully used.

In another embodiment of the embodiments of the present invention, if the resource configuration includes the resource allocation bandwidth, the communicating, by the UE, with the base station according to the resource configuration used for communication between the UE and the base station includes:

determining, by the UE according to the resource allocation bandwidth and resource allocation indication information of a physical data channel, a physical resource occupied by the physical data channel, where a logical channel carried by the physical data channel is a non-common logical channel.

In another embodiment, if the resource configuration includes the CSI pilot bandwidth, before the communicating, by the UE, with the base station according to the resource configuration used for communication between the UE and the base station, the method further includes:

receiving, by the UE, a CSI pilot bandwidth of the base station; and determining, by the UE according to the CSI pilot bandwidth configured for the UE by the base station and the CSI pilot bandwidth of the base station, a relative position, of the CSI pilot bandwidth configured for the UE by the base station, in the CSI pilot bandwidth of the base station, so as to intercept, according to the relative position from a CSI pilot sequence used by the base station, a CSI pilot sequence used by the UE; and the communicating, by the UE, with the base station according to the resource configuration used for communication between the UE and the base station is specifically:

performing, by the UE, CSI measurement in the CSI measurement bandwidth by using the intercepted CSI pilot sequence.

In another embodiment, if the resource configuration includes the CSI pilot bandwidth, and the CSI pilot bandwidth is an SRS frequency domain resource, the SRS frequency domain resource and an uplink system bandwidth are independent from each other.

If the CSI pilot is an uplink SRS, the receiving, by the UE, resource configuration that is sent by the base station by using dedicated signaling or a common message and used for communication between the UE and the base station includes:

receiving, by the UE, UE-level $C_{SRS}$, $B_{SRS}$, $b_{hop}$, and $n_{RRC}$ configured for the UE by the base station;

the communicating, by the UE, with the base station according to the resource configuration used for communication between the UE and the base station includes:

determining, by the UE, an SRS frequency domain resource according to the UE-level $C_{SRS}$, the $B_{SRS}$, the $b_{hop}$, and the $n_{RRC}$; and communicating, by the UE, with the base station according to the SRS frequency domain resource.

If the CSI pilot is an uplink SRS, the receiving, by the UE, resource configuration that is sent by the base station by using dedicated signaling or a common message and used for communication between the UE and the base station includes:

receiving, by the UE, $N_{RB,SRS}^{UL}$, UE-level or cell-level $C_{SRS}$, $B_{SRS}$, $b_{hop}$, and $n_{RRC}$ of the UE that are configured by the base station; and the communicating, by the UE, with the base station according to the resource configuration used for communication between the UE and the base station includes:

determining, by the UE, an SRS frequency domain resource according to the $N_{RB,SRS}^{UL}$, the UE-level or cell-level $C_{SRS}$, the $B_{SRS}$, the $b_{hop}$, and the $n_{RRC}$; and communicating, by the UE, with the base station according to the SRS frequency domain resource.

In another embodiment, if the resource configuration includes multiple CSI measurement bandwidths, the communicating, by the UE, with the base station according to the resource configuration used for communication between the UE and the base station includes:

independently performing, by the UE, CSI measurement in each CSI measurement bandwidth of the multiple CSI measurement bandwidths.

The method in this embodiment of the present invention may further be applied to a multi-carrier scenario that includes at least a first carrier and a second carrier. The receiving, by the UE, resource configuration that is sent by the base station by using dedicated signaling or a common message and used for communication between the UE and the base station is specifically:

receiving, by the UE on the first carrier, the resource configuration, sent by the base station by using the dedicated signaling or the common message, of the UE on the first carrier; and the method further includes:

receiving, by the UE on the first carrier, scheduling information, sent by the base station by using the dedicated signaling or the common message, of the UE on the second carrier, where the scheduling information includes any one or any combination of a resource allocation bandwidth, a CSI pilot bandwidth, and a CSI measurement bandwidth, and frequency number information of the second carrier.

The scheduling information, that is acquired by the UE on the first carrier, of the second carrier may further include parameters for determining a signal waveform of the second carrier, such as a multiple access manner and an air interface parameter (for example, a distribution mode of reference signals or a frame structure).

This embodiment of the present invention not only can be applicable to 3GPP LTE, but also can be applicable to communications systems including WIMAX and the like that use, but not limited to, an OFDM technology, and similarly can be also applicable to WCDMA, TD-SCDMA, CDMA2000, and the like that use, but not limited to, a CDMA technology.

The method embodiments of the embodiments of the present invention are described above, and apparatuses for implementing the foregoing methods are described below.

Figure 10:
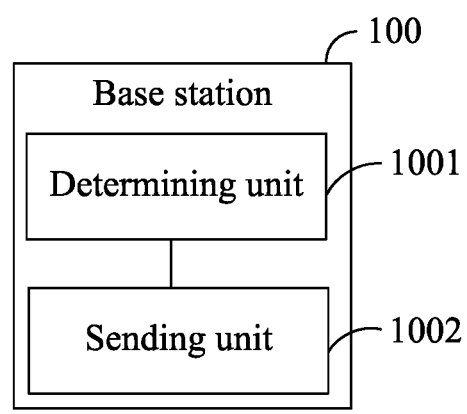
FIG. 10 is a schematic structural diagram of a base station according to an embodiment of the present invention.

Refer to FIG. 10, which is a schematic structural diagram of a base station according to an embodiment of the present invention.

The base station 100 may include:

a determining unit 1001, configured to: after a piece of user equipment UE establishes a connection with the base station according to a system bandwidth in a broadcast message, determine, for the user equipment, resource configuration used for communication between the UE and the base station, where the resource configuration includes at least one of a resource allocation bandwidth, a channel state information CSI pilot bandwidth, and a CSI measurement bandwidth, where the resource allocation bandwidth is a bandwidth used to generate resource block allocation information in downlink control information; and a sending unit 1002, configured to send, to the UE by using dedicated signaling or a common message, the resource configuration that is determined for the UE and used for communication between the UE and the base station.

In this embodiment of the present invention, a base station reconfigures a radio resource for a UE, so that the radio resource is effectively and fully used. This method can be applicable to many scenarios, which are, for example but are not limited to, FDM ICIC, a non-standard spectrum, and a capability difference between UEs.

In another embodiment of the embodiments of the present invention, the determining unit may include:

a first bandwidth determining subunit, configured to determine an actual available bandwidth of the UE; and a first resource determining subunit, specifically configured to determine, according to the actual available bandwidth of the UE, the resource configuration used for communication between the UE and the base station.

In another embodiment of the embodiments of the present invention, the determining unit is specifically configured to: if the resource configuration includes the resource allocation bandwidth, determine that the actual available bandwidth is located within the resource allocation bandwidth; if the resource configuration includes the CSI pilot bandwidth, determine that the CSI pilot bandwidth is located within the actual available bandwidth; and if the resource configuration includes the CSI measurement bandwidth, determine that the CSI measurement bandwidth is located within the actual available bandwidth.

In another embodiment of the embodiments of the present invention, the determining unit is specifically configured to: if the resource configuration includes the resource allocation bandwidth, determine a resource allocation bandwidth used by resource allocation indication information of a physical data channel, where a logical channel carried by the physical data channel is a non-common logical channel.

In another embodiment of the embodiments of the present invention, the determining unit is specifically configured to: when the CSI pilot is an uplink sounding reference signal SRS, determine UE-level SRS bandwidth configuration $C_{SRS}$, an SRS bandwidth $B_{SRS}$, a frequency hopping bandwidth $b_{hop}$, and a frequency domain position $n_{RRC}$ of the UE, so that the UE determines an SRS frequency domain resource according to the UE-level $C_{SRS}$, the $B_{SRS}$, the $b_{hop}$, and the $n_{RRC}$; or determine an SRS allocation bandwidth $N_{RB,SRS}^{UL}$, UE-level or cell-level $C_{SRS}$, $B_{SRS}$, $b_{hop}$, and $n_{RRC}$ of the UE, so that the UE determines an SRS frequency domain resource according to the $N_{RB,SRS}^{UL}$, the UE-level or cell-level $C_{SRS}$, the $B_{SRS}$, the $b_{hop}$, and the $n_{RRC}$.

In another embodiment of the embodiments of the present invention, the determining unit is specifically configured to determine multiple CSI measurement bandwidths, so that the UE independently performs CSI measurement in each CSI measurement bandwidth.

In another embodiment of the embodiments of the present invention, when the base station is applied to a multi-carrier scenario that includes at least a first carrier and a second carrier, the determining unit is specifically configured to determine the resource configuration of the UE on the first carrier; and the determining unit is further configured to determine scheduling information of the UE on the second carrier, where the scheduling information includes any one or any combination of a resource allocation bandwidth, a CSI pilot bandwidth, and a CSI measurement bandwidth, and frequency number information of the second carrier.

In another embodiment, the determining unit includes:

a second bandwidth determining subunit, configured to: before the scheduling information of the UE on the second carrier is determined, determine an actual available bandwidth of the UE on the second carrier; and a second resource determining subunit, configured to determine the scheduling information of the UE on the second carrier according to the actual available bandwidth of the UE on the second carrier.

In an embodiment, the second bandwidth determining subunit may include:

a broadcasting subunit, configured to broadcast spectrum indication information;

a first receiving subunit, configured to receive a spectrum that is sent by the UE and selected by the UE based on the spectrum indication information broadcast by the base station; and a first determining subunit, configured to determine the received spectrum, selected by the UE, as the actual available bandwidth.

In an embodiment, the second bandwidth determining subunit may include:

a second receiving subunit, configured to receive a spectrum range that is sent by the UE and selected by the UE within an available spectrum range; and a second determining subunit, configured to determine the actual available bandwidth in the spectrum range selected by the UE.

It should be noted that the foregoing or other operations and/or functions of the units/subunits of the base station in this embodiment of the present invention are used for implementing corresponding procedures of the methods in FIG. 1 to FIG. 8, and are not described in detail herein for the purpose of brevity.

Figure 11:
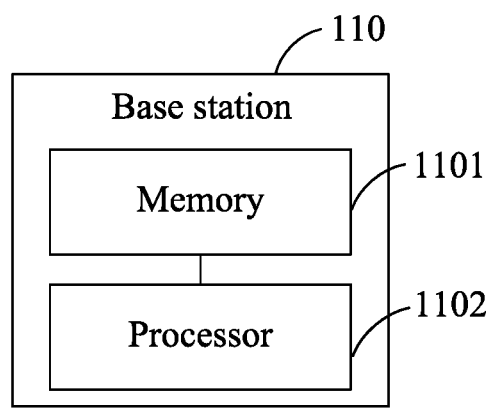
FIG. 11 is a schematic structural diagram of another base station according to an embodiment of the present invention.

Refer to FIG. 11, which is a schematic structural diagram of another base station according to an embodiment of the present invention.

The base station 110 may include a memory 1101 and a processor 1102, where the memory 1101 is configured to store a program, and the processor 1102 is configured to read the program in the memory 1101 to perform the following steps:

after a piece of user equipment UE establishes a connection with the base station according to a system bandwidth in a broadcast message, determining, for the user equipment, resource configuration used for communication between the UE and the base station, where the resource configuration includes at least one of a resource allocation bandwidth, a channel state information CSI pilot bandwidth, and a CSI measurement bandwidth, where the resource allocation bandwidth is a bandwidth used to generate resource block allocation information in downlink control information; and sending, by the base station to the UE by using dedicated signaling or a common message, the resource configuration that is determined for the UE and used for communication between the UE and the base station.

In this embodiment of the present invention, a base station reconfigures a radio resource for a UE, so that the radio resource is effectively and fully used. This method can be applicable to many scenarios, which are, for example but are not limited to, FDM ICIC, a non-standard spectrum, and a capability difference between UEs.

Figure 12:
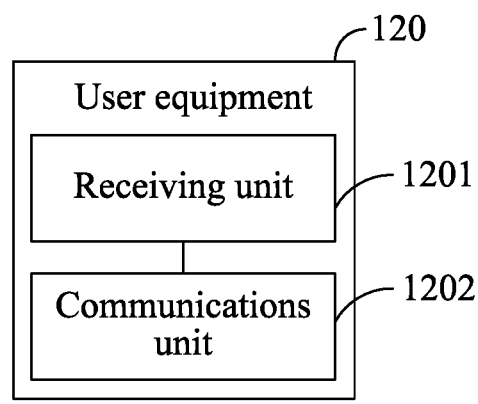
FIG. 12 is a schematic structural diagram of a piece of user equipment according to an embodiment of the present invention.

Refer to FIG. 12, which is a schematic structural diagram of a piece of user equipment according to an embodiment of the present invention.

The UE 120 may include:

a receiving unit 1201, configured to: after the user equipment UE establishes a connection with a base station according to a system bandwidth in a broadcast message, receive resource configuration that is sent by the base station by using dedicated signaling or a common message and used for communication between the UE and the base station, where the resource configuration is determined by the base station for the UE, and the resource configuration includes at least one of a resource allocation bandwidth, a channel state information CSI pilot bandwidth, and a CSI measurement bandwidth, where the resource allocation bandwidth is a bandwidth used to generate resource block allocation information in downlink control information; and a communications unit 1202, configured to communicate with the base station according to the resource configuration used for communication between the UE and the base station.

In this embodiment of the present invention, after establishing a connection with a base station, a UE obtains a radio resource reconfigured for the UE by the base station, and then communicates with the base station by using the radio resource, so that the radio resource is effectively and fully used.

In another embodiment of the embodiments of the present invention, if the resource configuration includes the resource allocation bandwidth, the communications unit is configured to determine, according to the resource allocation bandwidth and resource allocation indication information of a physical data channel, a physical resource occupied by the physical data channel, where a logical channel carried by the physical data channel is a non-common logical channel.

In another embodiment of the embodiments of the present invention, the user equipment further includes:

an information receiving unit, configured to: when the resource configuration includes the CSI pilot bandwidth, before the communications unit communicates with the base station according to the resource configuration configured by the base station, receive a CSI pilot bandwidth of the base station; and a sequence acquisition unit, configured to determine, according to the CSI pilot bandwidth configured for the UE by the base station and the CSI pilot bandwidth of the base station, a relative position, of the CSI pilot bandwidth configured for the UE by the base station, in the CSI pilot bandwidth of the base station, so as to intercept, according to the relative position from a CSI pilot sequence used by the base station, a CSI pilot sequence used by the UE, where the communications unit is specifically configured to perform CSI measurement in the CSI measurement bandwidth by using the intercepted CSI pilot sequence.

In another embodiment of the embodiments of the present invention, the receiving unit is specifically configured to: when the CSI pilot is an uplink sounding reference signal SRS, receive UE-level SRS bandwidth configuration $C_{SRS}$, an SRS bandwidth $B_{SRS}$, a frequency hopping bandwidth $b_{hop}$, and a frequency domain position $n_{RRC}$ that are configured for the UE by the base station; and the communications unit includes:

a first determining subunit, configured to determine an SRS frequency domain resource according to the UE-level $C_{SRS}$, the $B_{SRS}$, the $b_{hop}$, and the $n_{RRC}$; and a first communications subunit, configured to communicate with the base station according to the SRS frequency domain resource determined by the first determining subunit.

In another embodiment, the receiving unit is configured to: when the CSI pilot is an uplink SRS, receive an SRS allocation bandwidth $N_{RB,SRS}^{UL}$, and UE-level or cell-level $C_{SRS}$, $B_{SRS}$, $b_{hop}$, and $n_{RRC}$ of the UE that are configured by the base station; and the communications unit includes:

a second determining subunit, configured to determine an SRS frequency domain resource according to the $N_{RB,SRS}^{UL}$, the UE-level or cell-level $C_{SRS}$, the $B_{SRS}$, the $b_{hop}$, and the $n_{RRC}$; and a second communications subunit, configured to communicate with the base station according to the SRS frequency domain resource determined by the second determining subunit.

In another embodiment, the communications unit is specifically configured to: when the resource configuration includes multiple CSI measurement bandwidths, independently perform CSI measurement in each CSI measurement bandwidth of the multiple CSI measurement bandwidths.

In another embodiment, the receiving unit is configured to: when the user equipment is applied to a multi-carrier scenario that includes at least a first carrier and a second carrier, receive, on the first carrier, the resource configuration, sent by the base station by using the dedicated signaling or the common message, of the UE on the first carrier; and receive, on the first carrier, scheduling information, sent by the base station by using the dedicated signaling or the common message, of the UE on the second carrier, where the scheduling information includes any one or any combination of a resource allocation bandwidth, a CSI pilot bandwidth, and a CSI measurement bandwidth, and frequency number information of the second carrier. The scheduling information, that is acquired by the receiving unit on the first carrier, of the second carrier may further include parameters for determining a signal waveform of the second carrier such as a multiple access manner and an air interface parameter (for example, a distribution mode of reference signals or a frame structure).

It should be noted that the foregoing or other operations and/or functions of the units/subunits of the user equipment in this embodiment of the present invention are used for implementing corresponding procedures of the method in FIG. 9, and are not described in detail herein for the purpose of brevity.

Figure 13:
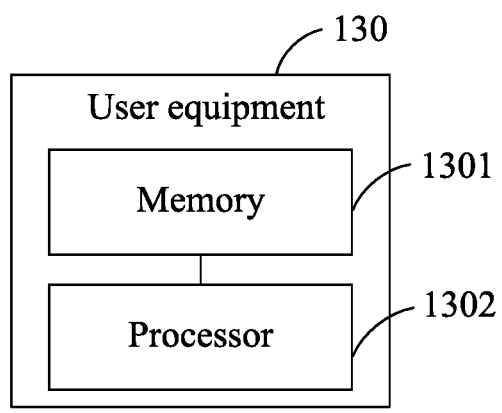
FIG. 13 is a schematic structural diagram of another user equipment according to an embodiment of the present invention.

Refer to FIG. 13, which is a schematic structural diagram of another user equipment according to an embodiment of the present invention.

The user equipment 130 may include a memory 1301 and a processor 1302, where the memory 1301 is configured to store a program, and the processor 1302 is configured to read the program in the memory 1301 to perform the following steps:

after the user equipment UE establishes a connection with a base station according to a system bandwidth in a broadcast message, receiving, by the UE, resource configuration that is sent by the base station by using dedicated signaling or a common message and used for communication between the UE and the base station, where the resource configuration is determined by the base station for the UE, and the resource configuration includes at least one of a resource allocation bandwidth, a channel state information CSI pilot bandwidth, and a CSI measurement bandwidth, where the resource allocation bandwidth is a bandwidth used to generate resource block allocation information in downlink control information; and communicating, by the UE, with the base station according to the resource configuration used for communication between the UE and the base station.

In this embodiment of the present invention, after establishing a connection with a base station, a UE obtains a radio resource reconfigured for the UE by the base station, and then communicates with the base station by using the radio resource, so that the radio resource is effectively and fully used.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in the embodiments of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A non-transitory computer-readable medium comprising instructions that, when executed, cause an apparatus to implement a radio resource configuration method, comprising:
    sending a broadcast message comprising a first bandwidth information of a first bandwidth of a carrier to a user equipment (UE); and
    sending, through a radio resource control reconfiguration message, a second bandwidth information of a second bandwidth of the carrier to the UE, wherein configuring of a second bandwidth value of the second bandwidth is without reference to a first bandwidth value of the first bandwidth, and the second bandwidth is used to determine resource allocation information in downlink control information.

2. The medium according to claim 1, further comprising: receiving capability information of the UE.

3. The medium according to claim 1, wherein the second bandwidth of the one carrier is used for determining resource allocation information of a physical data channel, wherein a logical channel carried by the physical data channel comprises a non-common logical channel.

4. The medium according to claim 1, wherein the first bandwidth of the carrier is used for determining resource allocation information of a physical data channel, wherein a logical channel carried by the physical data channel comprises a common logical channel.

5. The medium according to claim 1, wherein establishment of a radio resource control (RRC) connection is based on the first bandwidth information.

6. The medium according to claim 2, wherein the second bandwidth information is based on the capability information of the UE.

7. The medium according to claim 1, wherein the first bandwidth is a downlink bandwidth, and the second bandwidth is a downlink bandwidth.

8. The medium according to claim 1, wherein the first bandwidth is an uplink bandwidth, and the second bandwidth is an uplink bandwidth.

9. A non-transitory computer-readable medium comprising instructions that, when executed, cause an apparatus to implement a radio resource configuration method, comprising:
    receiving, from a network device, a broadcast message comprising a first bandwidth information of a first bandwidth of one carrier;
    receiving, from the network device, through dedicated signaling, a second bandwidth information of a second bandwidth of the one carrier, the second bandwidth information comprising a bandwidth used to determine resource block allocation information in downlink control information and a a first bandwidth value of the first bandwidth is not used for configuration of a second bandwidth value of the second bandwidth; and
    communicating with the network device according to the second bandwidth information.

10. The medium according to claim 9, the instructions further causes the apparatus to:
    determine, according to the second bandwidth and resource allocation indication information of a physical data channel, a physical resource occupied by the physical data channel, wherein a logical channel carried by the physical data channel comprising a non-common logical channel.

11. The medium according to claim 9, the instructions further causes the apparatus to send capability information.

12. The medium according to claim 9, the instructions further causes the apparatus to:
    determine, according to the first bandwidth and resource allocation information of a physical data channel, a physical resource occupied by the physical data channel, wherein a logical channel carried by the physical data channel comprises a common logical channel.

13. The medium according to claim 9, wherein establishment of a radio resource control (RRC) connection is based on the first bandwidth information.

14. The medium according to claim 11, wherein the second bandwidth information is based on the capability information.

15. The medium according to claim 9, wherein the first bandwidth is a downlink bandwidth, and the second bandwidth is a downlink bandwidth.

16. The medium according to claim 9, wherein the first bandwidth is an uplink bandwidth, and the second bandwidth is an uplink bandwidth.

17. A communication system, comprising:
a network device configured to:
send a broadcast message comprising a first bandwidth information of a first bandwidth of a carrier to a user equipment (UE); and
send, through a radio resource control reconfiguration message, a second bandwidth information of the second bandwidth of the carrier to the UE, wherein configuring of a second bandwidth value of the second bandwidth is without reference to a first bandwidth value of the first bandwidth, the second bandwidth is used to determine resource allocation information in downlink control information;
the UE configured to:
receive, from the network device, the first bandwidth information of the carrier;
receive, from the network device through the radio resource control reconfiguration message, the second bandwidth information of the carrier; and
communicate with the network device according to the second bandwidth information.

18. The system according to claim 17, wherein the UE is further configured to send capability information of the UE to the network device.

19. The system according to claim 17, wherein the second bandwidth of the carrier is used for determining resource allocation information of a physical data channel, wherein a logical channel carried by the physical data channel comprises a non-common logical channel.

20. The system according to claim 17, the first bandwidth of the carrier is used for determining resource allocation information of a physical data channel, wherein a logical channel carried by the physical data channel comprises a common logical channel.

21. The system according to claim 17, wherein establishment of a radio resource control (RRC) connection is based on the first bandwidth information.

22. The system according to claim 18, wherein the second bandwidth information is based on the capability information of the UE.

23. The system according to claim 17, wherein the first bandwidth is a downlink bandwidth, and the second bandwidth is a downlink bandwidth.

24. The system according to claim 17, wherein the first bandwidth is an uplink bandwidth, and the second bandwidth is an uplink bandwidth.

25. A method, comprising:
receiving, from a network device, a broadcast message comprising a first bandwidth information of a first bandwidth of a carrier;
receiving, from the network device, through a radio resource control reconfiguration message, a second bandwidth information of a second bandwidth of the carrier, the second bandwidth being used to determine resource block allocation information in downlink control information, and configuration of a second bandwidth value of the second bandwidth is without reference to the first bandwidth; and
communicating with the network device according to the second bandwidth information.

26. The method according to claim 25, further comprising:
determining, according to the second bandwidth and resource allocation information of a physical data channel, a physical resource occupied by the physical data channel, wherein a logical channel carried by the physical data channel comprises a non-common logical channel.

27. The method according to claim 26, wherein establishment of a radio resource control (RRC) connection is based on the first bandwidth information.

28. The method according to claim 25, further comprising:
sending capability information to the network device.

29. The method according to claim 25, further comprising:
determining, according to the first bandwidth and resource allocation information of a physical data channel, a physical resource occupied by the physical data channel, wherein a logical channel carried by the physical data channel comprising a common logical channel.

30. The method according to claim 25, wherein the first bandwidth is a downlink bandwidth, and the second bandwidth is a downlink bandwidth.

31. The method according to claim 25, wherein the first bandwidth is an uplink bandwidth, and the second bandwidth is an uplink bandwidth.

32. An apparatus, comprising:
a circuitry configured to receive, from a network device, a broadcast message comprising a first bandwidth information of a first bandwidth of a carrier, and receive, from the network device, through a radio resource control reconfiguration message, a second bandwidth information of a second bandwidth of the carrier, the second bandwidth being used to determine resource block allocation information in downlink control information, and configuration of a second bandwidth value of the second bandwidth is without reference to the first bandwidth; and
a circuitry configured to communicate with the network device according to the second bandwidth information.

33. The apparatus according to claim 32, further comprising:
a circuitry configured to determine, according to the second bandwidth and resource allocation indication information of a physical data channel, a physical resource occupied by the physical data channel, wherein a logical channel carried by the physical data channel comprising a non-common logical channel.

34. The apparatus according to claim 32, wherein establishment of a radio resource control (RRC) connection is based on the first bandwidth information.

35. The apparatus according to claim 32, the apparatus is further configured to send capability information to the network device.

36. The apparatus according to claim 32, further comprising:
a circuitry configured to determine, according to the first bandwidth and resource allocation information of a physical data channel, a physical resource occupied by the physical data channel, wherein a logical channel carried by the physical data channel comprising a common logical channel.

37. The apparatus according to claim 32, wherein the first bandwidth is a downlink bandwidth, and the second bandwidth is a downlink bandwidth.

38. The apparatus according to claim 32, wherein the first bandwidth is an uplink bandwidth, and the second bandwidth is an uplink bandwidth.

\* \* \* \* \*

UNITED STATES PATENT AND TRADEMARK OFFICE
CERTIFICATE OF CORRECTION

PATENT NO. : 10,912,091 B2
APPLICATION NO. : 16/161863
DATED : February 2, 2021
INVENTOR(S) : Zhang et al.

It is certified that error appears in the above-identified patent and that said Letters Patent is hereby corrected as shown below:

On the Title Page

Item (57), Abstract, Line 6: replace "UE, resource configuration" with --UE, a resource configuration--

In the Specification

Column 1, Line 32: replace "spectrum resources, of the UE, used" with --spectrum resources of the UE used--
Column 14, Line 23: replace "N" with --NRBUL--
Column 14, Line 37: replace "N" with --NRBUL--

In the Claims

Column 28, Claim 3, Line 9: replace "one carrier" with --carrier--
Column 28, Claim 9, Line 37: replace "one carrier" with --a carrier--
Column 28, Claim 9, Line 40: replace "one carrier," with --carrier,--
Column 28, Claim 9, Line 41: replace "a bandwidth used" with --a bandwidth being used--
Column 28, Claim 9, Line 43: replace "a a first bandwidth" with --a first bandwidth--
Column 28, Claim 10, Line 54: replace "comprising" with --comprises--
Column 29, Claim 20, Line 39: replace "the" with --wherein the--

Signed and Sealed this
Eleventh Day of October, 2022

Katherine Kelly Vidal
*Director of the United States Patent and Trademark Office*